United States Patent [19]

Mori

[11] Patent Number: 4,907,626
[45] Date of Patent: Mar. 13, 1990

[54] WRAPPED BUSH HAVING IDENTICAL JOINT PORTIONS IN ENDS JOINED AT JOINT

[75] Inventor: Sanae Mori, Nagoya, Japan

[73] Assignee: Daido Metal Company, Ltd., Nagoya, Japan

[21] Appl. No.: 202,571

[22] Filed: May 25, 1988

[30] Foreign Application Priority Data

Jun. 2, 1987 [JP] Japan ................... 62-138682

[51] Int. Cl.⁴ ............................................. F16L 57/00
[52] U.S. Cl. .......................................... 138/156; 16/2;
29/898.056; 29/898.057; 138/166
[58] Field of Search ............... 138/162, 166, 168, 169,
138/128, 155, 156, 159, 149; 16/108, 2; 29/428,
244, 237, 149.5 R, 149.5 S, 149.5 DP, 149.5
NM; 384/286, 287, 288, 289, 290, 217, 901

[56] References Cited

U.S. PATENT DOCUMENTS

| | | | |
|---|---|---|---|
| 1,298,100 | 3/1919 | Royce | 138/156 |
| 2,762,117 | 9/1956 | Houck | 16/2 |
| 2,762,118 | 9/1956 | Shaw | 16/2 |
| 2,784,129 | 3/1957 | Stephens | 138/166 |
| 4,292,718 | 10/1981 | Iijima | 29/149.5 DP |
| 4,655,615 | 4/1987 | Mori | 384/286 |
| 4,660,401 | 4/1987 | Kohama et al. | 29/149.5 DP |

FOREIGN PATENT DOCUMENTS 44-7446 3/1969 Japan .
44-20681 9/1969 Japan .

Primary Examiner—Henry J. Recla
Assistant Examiner—Glenn T. Barrett
Attorney, Agent, or Firm—Browdy and Neimark

[57] ABSTRACT

A wrapped bush having its ends joined at a joint. First and second joint portions are formed in the corresponding end portions of the bush that are to be joined at the joint, and they each have at least one pair consisting of a recess and a projection. The first and second joint portions are of the same configuration and of the same size but are formed at positions shifted along the corresponding end portions. Further, the first and second joint portions are arranged in such a manner that, when the end portions of the bush are joined, one joint portion formed in one end portion is supplementary with the other joint portion formed in the other end portion.

5 Claims, 4 Drawing Sheets

WRAPPED BUSH HAVING IDENTICAL JOINT PORTIONS IN ENDS JOINED AT JOINT

BACKGROUND OF THE INVENTION

Field of the Invention

The present invention relates to a wrapped bush joined at ends thereof and, more particularly, to a wrapped bush in which the ends to be joined at the joint of the bush are formed with joint portions which each have at least one pair consisting of a recess and a projection and which are of the same configuration and of the same size but are shifted in the axial direction of the bush in such a manner that one joint portion of one end is disposed in supplementary relationship with the other joint portion of the other end, the bush thus being adapted to prevent the joint at which the ends are joined from expanding widthwise.

There are two types of joints of known wrapped bushes: the butt type joint (see FIG. 12) and the fastened type joint (i.e., the clinch type joint, see FIGS. 8 to 11). These two types are used in accordance with the purpose. The butt type joint, which involves no fastening force at the joint, is generally used from the viewpoint of economic efficiency, whereas the fastened type joint, which involves fastening force at the joint, is used when required by the function. A known wrapped bush of the fastened type usually has joint portions having at least one pair consisting of male and female portions of different configurations.

However, such a known wrapped bush of the fastened type, whose male and female portions at the joint portions have different configuration, tends to be unsatisfactorily formed, in particular, at its joint. This will be described in detail. As shown in FIGS. 8 to 11, a wrapped bush of this type may be either a wrapped bush 16a, 16b, or 16c, shown in FIGS. 8 to 10, in which the joint 7d, 7e, or 7f is formed by the engagement between a single pair consisting of male and female portions 18a, 18b, or 18c, that is, by the so-called single clinch; or a wrapped bush 17, shown in FIG. 11 in which the joint 7g is formed by the engagement between a plurality of pairs each consisting of male and female portions 19, that is, by the so-called complex clinch.

With each of the wrapped bush of the fastened type shown in FIGS. 8 to 11, in which the male and female portions of each pair have different configurations, although the ends of the bush can be joined by a large fastening (clinching) force, there is a difference in strength between the ends, particularly, in widthwise strength. Consequently, when the ends are joined, the bush expands widthwise, making it necessary to subject the bush to machining to cut off any expanded portion. Thus, the known wrapped bush of the above-described type fails to be properly formed, causing various problems such as an increase in production costs.

SUMMARY OF THE INVENTION

An object of the present invention is to eliminate the above-discussed problem which have been inevitably encountered by the known wrapped bush.

To this end, according to the present invention, a wrapped bush has end portions to be joined at a joint, and at least one pair consisting of a recess capable of serving as a female portion and a projection capable of serving as a male portion which are formed in each of the end portions so that at least two pairs each consisting of a recess and a projection are formed in the end portions. A first joint portion is formed in one of the end portions and has one pair consisting of a female recess portion and a male projection portion, while a second joint portion is formed in the other of the end portions and has another pair consisting of a female recess portion and a male projection portion, the first and second joint portions being of the same configuration and of the same size but being formed at positions shifted in the widthwise direction of the bush, i.e., in the axial direction thereof, and the first and second joint portions being arranged in such a manner that, when the end portions of the bush are joined at the joint, the recess of the first joint portion engages with the projection of the second joint portion while the projection of the first joint portion engages with the recess of the second joint portion. Since the joint portions which are formed in the corresponding end portions to be joined at the joint of the bush have the same configuration and the same size, the widthwise strengths of the end portions of the bush are the same, thereby making it possible to prevent the bush from widthwisely expanding, such expansion being experienced by a known joined wrapped bush whose male and female portions have different configurations. Therefore, it is possible to omit the machining operation required to cut off any expanded portion.

DESCRIPTION OF THE PREFERRED EMBODIMENTS

Figure 1:
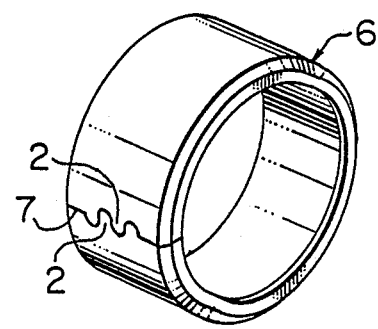
FIG. 1 is a perspective view illustrating a wrapped bush in accordance with a first embodiment of the present invention.
Figure 2:
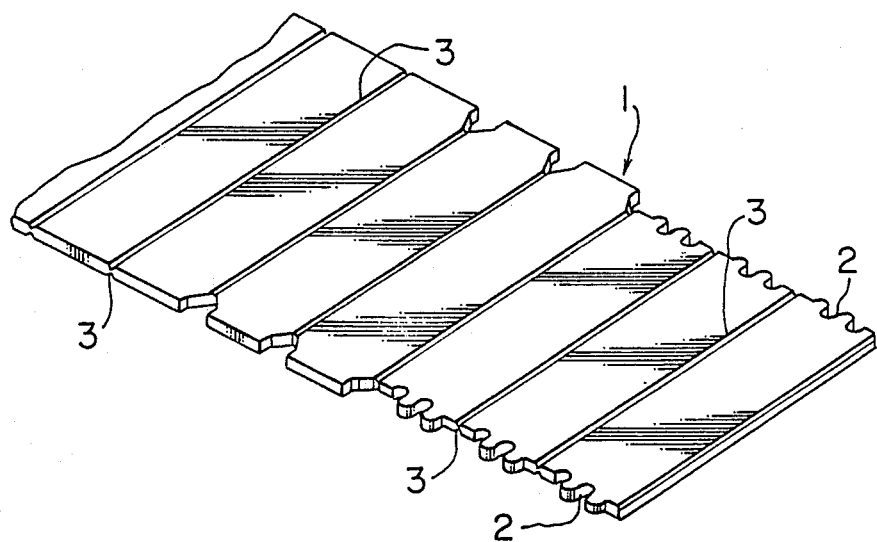
FIG. 2 is a perspective view showing a stock layout for the wrapped bush in accordance with the first embodiment.
Figure 3:
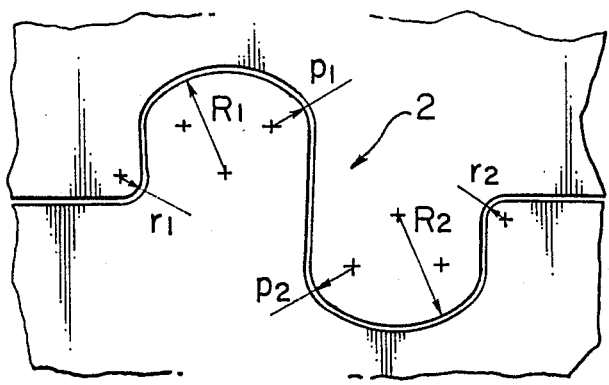
FIG. 3 is an enlarged plan view of joint portions of the bush, showing their contours.

FIGS. 1 to 3 illustrate a wrapped bush 6 in accordance with a first embodiment of the present invention. Referring to FIG. 2, a band-shaped plate 1 for bushes has, on both widthwise ends thereof, a plurality of sets of joint portions 2 formed by stamping. Each set comprises opposing joint portions 2 each having a recess capable of serving as a female portion and a projection capable of serving as a male portion that are formed therein in a zigzag manner. One set of joint portions 2 formed at the corresponding parts of the widthwise ends have the same configuration and the same size, but they are formed at positions shifted in the widthwise, i.e. axial, direction of the bush which will be formed of this set, in such a manner that, when the widthwise ends of the set are joined to form the bush, the recess at one end engages with the projection of the other, while the projection at the one end engages with the recess of the other. In this way, each set of the joint portions 2 can be joined together at a joint with ease and without causing any widthwise expansion.

Further, a plurality of grooves 3 which each have a V-shaped cross-section are formed in the surfaces of the plate 1, and the plate 1 is cut along these grooves 3 into pieces. Each piece is wrapped into a cylindrical shape, so as to obtain the wrapped bush 6 shown in FIG. 1. An example of the contour of the joint portions 2 is shown in FIG. 3 at an enlarged scale.

From FIG. 3 it is seen that the projections or joining elements have semi-circular curves of major radius $R_1$ and $R_2$ from their respective centerpoints. Along outside edges which transition to a transverse joining line are reverse curves of minor radius $r_1$ and $r_2$, and along inside edges which transition to an inclined longitudinal joining line are curves of minor radius $p_1$ and $p_2$. As can also be seen, the sum of the radii $R_1$ and $R_2$ is greater than the distance between their centerpoints whereby interfitting of the projections causes them to lock together or clinch.

Figure 4:
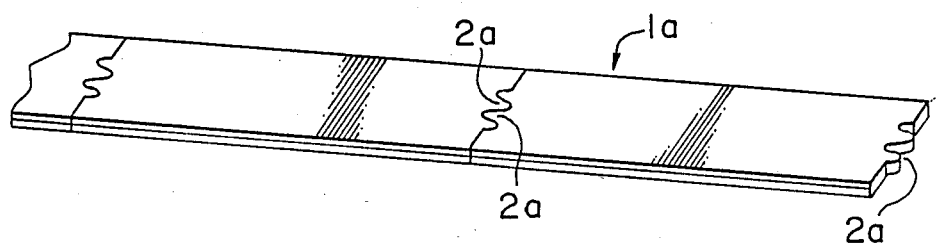
FIG. 4 is a perspective view showing a stock layout for a wrapped bush in accordance with a second embodiment of the present invention.

A wrapped bush in accordance with a second embodiment of the present invention is prepared using a stock layout shown in FIG. 4. In this embodiment, joint portions 2a having edges substantially perpendicular to the plane of the plate are formed widthwise in a band-shaped plate 1a for bushes and serve also as locations at which the plate 1a is cut, so that the longitudinal direction of the band-shaped plate 1a corresponds to the direction in which bushes will be wrapped. This stock layout provides a higher level of stock utilization than that provided by the stock layout shown in FIG. 2.

Figure 5:
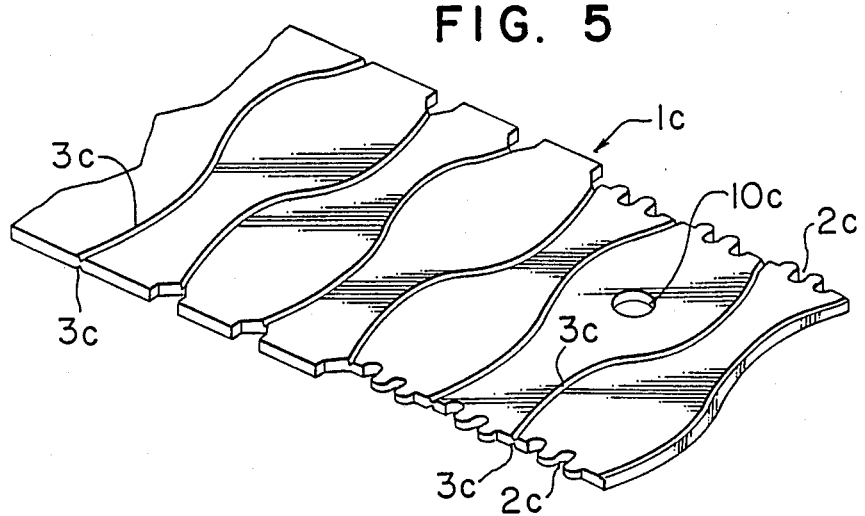
FIG. 5 is a perspective view showing a stock layout for a tapered wrapped bush in accordance with a third embodiment of the present invention.
Figure 6:
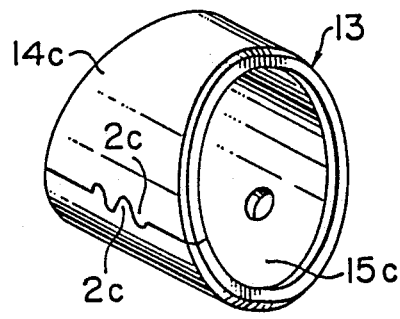
FIG. 6 is a perspective view of the tapered wrapped bush in accordance with the third embodiment.
Figure 7:
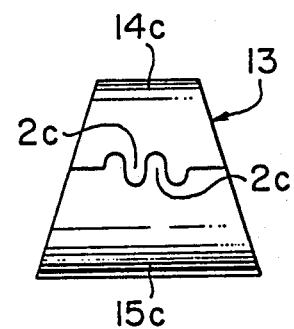
FIG. 7 is a side view of the tapered wrapped bush in accordance with the third embodiment.
Figure 8:
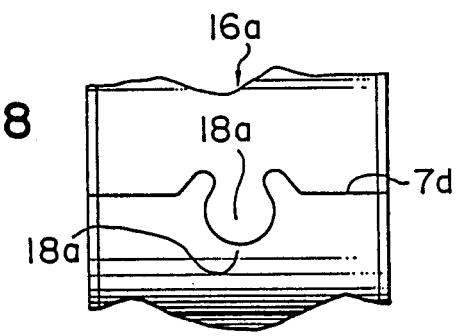
FIGS. 8, 9, and 10 are each a fragmentary view of a known wrapped bush in which joint portions provide single-clinch.
Figure 9:
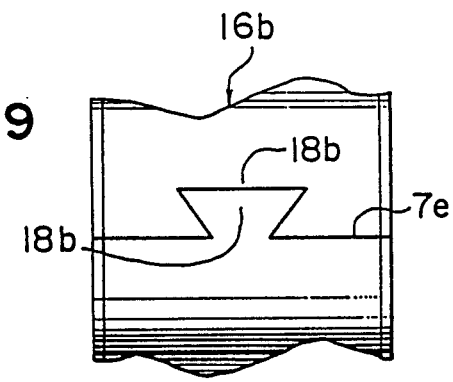
Figure 10:
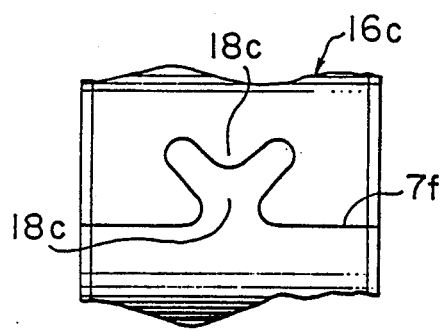
Figure 11:
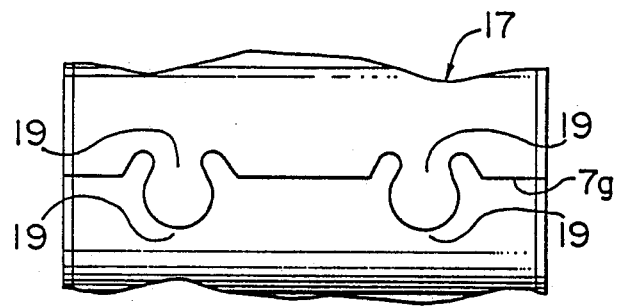
FIG. 11 is a fragmentary view of another known wrapped bush in which joint portions provide complex clinch.
Figure 12:
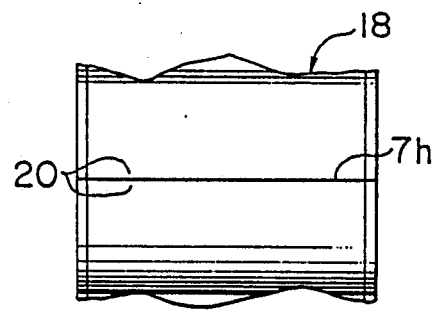
FIG. 12 is a fragmentary view of a further known wrapped bush having joint portions of the butt type.

FIGS. 5 to 7 illustrate a tapered wrapped bush 13 in accordance with a third embodiment of the present invention. Referring to FIG. 5, a plurality of grooves 3c each having a V-shaped cross-section are formed in the surfaces of a band-shaped plate 1a widthwise thereof in such a manner that two adjacent grooves 3c partly define a gourd-like-shape, with two curved lines of each groove corresponding to the planar development of one side surface of the bush 13 if the joint portions 2c of the bush are separated. The joint portions 2c are formed in the side surfaces of the plate 1c by stamping, the plate 1c is cut into pieces along the V-shaped grooves 3c, and each piece is wrapped in the widthwise direction of the plate 1c, so as to obtain the tapered wrapped bush 13. As shown in FIG. 7, the thus prepared bush 13 has a trapezoidal configuration when viewed in the lateral direction.

The present invention provides the following effects:

(1) The joint portions 2 formed in the corresponding end portions of the bush each have engageable female and male portions and are of the same configuration and of the same size. Therefore, the joint portions 2 of a bush exhibit a high level of fitting ability and allow the bush to be formed properly.

(2) If it is desired to increase the fastening (engaging) force in the joint portions between the female and male portions, to a level achievable with the prior art, it suffices to subject the end portions to stamping both in the circumferential and axial direction of the bush, and no cutting operation is necessary in contrast with the prior art.

What is claimed is:

1. A bush formed of a piece of plate which has been cut out from a band-shaped plate for bushes wrapped to a cylindrical form and having first and second ends jointed at a joint, said ends having facing edges which are substantially perpendicular to the plane of the plate, each of said first and second ends having at least one pair of joining elements consisting of a recess and a projection of the same size and configuration, said joining elements of said first end being of the same configuration and of the same size as those of said second end but being formed at positions shifted axially so that said joining elements of said first and second ends are arranged in such a manner that, when said ends of said bush are joined at said joint, a pair of said joining elements formed in one of said ends is complementary and interfits with the pair of said joining elements formed in the other of said ends, each joining element having a radius of curvature R extending from a centerpoint whereby 2R is greater that the distance between adjacent centerpoints so that said joining elements interlock with one another.

2. A wrapped bush having identical joint portions in ends joined at a joint according to claim 1, wherein said bush consists of said piece of plate which has been cut out from a band-shaped plate for bushes by cutting said band-shaped plate widthwisely, the side surfaces of said band-shaped plate being formed with said joining elements which will be disposed at the corresponding ends that are to be joined at said joint, said band-shaped plate being cut into pieces used to form individual bushes.

3. A wrapped bush having identical joint portions in ends joined at a joint according to claim 1, wherein said bush consists of said piece of plate which has been cut out from a band-shaped plate for bushes by cutting said band-shaped plate widthwisely, the widthwise surfaces formed by cutting said band-shaped plate being formed with said joining elements of said bush which will be disposed at the corresponding ends that are to be joined at said joint.

4. A joined wrapped bush having identical joint portions in ends joined at a joint according to claim 1, wherein said bush is a tapered wrapped bush and consists of said piece of plate which has been cut out from a band-shaped plate for bushes by cutting said band-shaped plate widthwisely, said piece of plate having a gourd-like-shape partly defined by two curves corresponding to the planar development of one side surface of said bush, the side surfaces of said band-shaped plate being formed with said joining elements of said bush which will be disposed at the corresponding ends that are to be joined to form said bush.

5. A joined wrapped bush having identical joint portions in ends joined at a joint according to claim 2, wherein said bush is a tapered wrapped bush and consists of said piece of plate which has been cut out from a band-shaped plate for bushes by cutting said band-shaped plate widthwisely, said piece of plate having a gourd-like-shape partly defined by two curves corresponding to the planar development of one side surface of said bush, the side surfaces of said band-shaped plate being formed with said joining elements of said bush which will be disposed at the corresponding ends that are to be joined to form said bush.

* * * * *